US012744331B2

(12) United States Patent
Chiang

(10) Patent No.: US 12,744,331 B2

(45) Date of Patent: Sep. 22, 2026

(54) MIMO ANTENNA SYSTEM

(71) Applicant: MEDIATEK INC., Hsinchu City (TW)

(72) Inventor: Chung-Hsin Chiang, Hsinchu City (TW)

(73) Assignee: MEDIATEK INC., Hsinchu City (TW)

(*) Notice: Subject to any disclaimer, the term of this patent is extended or adjusted under 35 U.S.C. 154(b) by 89 days.

(21) Appl. No.: 18/821,119

(22) Filed: Aug. 30, 2024

(65) Prior Publication Data

US 2025/0087903 A1 Mar. 13, 2025

Related U.S. Application Data

(60) Provisional application No. 63/581,023, filed on Sep. 7, 2023.

(51) Int. Cl.

*H01Q 21/24* (2006.01)
*H01Q 1/24* (2006.01)
*H01Q 1/27* (2006.01)

(52) U.S. Cl.

CPC ............. *H01Q 21/24* (2013.01); *H01Q 1/273* (2013.01)

(58) Field of Classification Search

CPC ........ H01Q 1/241; H01Q 1/243; H01Q 1/273; H01Q 1/521; H01Q 21/24; H01Q 21/28; H01Q 25/001; H01Q 25/005; H01Q 25/04

See application file for complete search history.

(56) References Cited

U.S. PATENT DOCUMENTS

| | | | |
|---|---|---|---|
| 10,804,602 B2 | 10/2020 | Zhao | |
| 2020/0076055 A1 | 3/2020 | Jeon | |
| 2021/0066788 A1 | 3/2021 | Kim | |
| 2022/0336967 A1 | 10/2022 | Park | |

FOREIGN PATENT DOCUMENTS

| | | | |
|---|---|---|---|
| EP | 3208887 A1 * | 8/2017 | ............... H01Q 1/42 |
| WO | 2023037806 A1 | 3/2023 | |

OTHER PUBLICATIONS

Extended European Search Report dated Dec. 23, 2024, issued in application No. EP 24198059.8.

Chiu, C.Y., et al.; "Compact Four-Port Antenna Suitable for Portable MIMO Devices;" IEEE Antennas and Wireless Propagation Letters; vol. 7; Jan. 2008; pp. 142-144.

Wong, K.L.,, et al.; "Eight-Planar-Monopole MIMO Circular Array Generating Eight Uncorrelated Waves for 6G Upper Mid-Band 8×8 MIMO Access Points;" IEEE Access; Jul. 2023; pp. 1-13.

* cited by examiner

*Primary Examiner* — Hoang V Nguyen

(74) *Attorney, Agent, or Firm* — McClure, Qualey & Rodack, LLP

(57) ABSTRACT

A MIMO (multiple input and multiple output) antenna system is provided. The MIMO antenna system includes a dielectric substrate, a first MIMO antenna, and a second MIMO antenna. The first MIMO antennas is mounted on the dielectric substrate. The second MIMO antenna is mounted on the dielectric substrate and located beside the first MIMO antenna. The first MIMO antenna and the second MIMO antenna are configured to wirelessly access a set of first signals.

15 Claims, 12 Drawing Sheets

MIMO ANTENNA SYSTEM

CROSS REFERENCE TO RELATED APPLICATIONS

This application claims the benefit of U.S. Provisional Application No. 63/581,023, filed Sep. 7, 2023, the entirety of which is incorporated by reference herein.

BACKGROUND OF THE INVENTION

Field of the Invention

The present disclosure relates to a MIMO (multiple input and multiple output) antenna system, and, in particular, to the arrangement of MIMO antennas in a MIMO antenna system.

Description of the Related Art

Antennas are essential components of all modern electronic devices that require radio-frequency functionality, such as smartphones, tablet computers, and notebook computers. As communication standards evolve to provide faster data transfer rates and higher throughput, the demands placed on antennas are becoming more challenging. For example, to meet the requirements of fifth-generation (5G) mobile telecommunication at FR2 (Frequency Range 2) bands with MIMO (multiple input and multiple output) of multiple-polarization diversity, antennas need to support broader bandwidths. They also need to be able to transmit and receive independent signals of different polarizations with high signal isolation between these different polarizations, so as to provide high cross-polarization discrimination (XPD).

Moreover, antennas need to be compact in size, since modern electronic devices need to be slim, lightweight, and portable, and these devices have limited space available for an antenna. Accordingly, antennas need to have a high bandwidth-to-volume ratio representing the amount of bandwidth per unit volume (measured in, e.g., Hz/($mm^3$)). In order to improve communication with high-end smartphone applications, an antenna with enhanced performance and a small size is desirable.

BRIEF SUMMARY OF THE INVENTION

An embodiment of the present disclosure provides a MIMO antenna system. The MIMO antenna system includes a dielectric substrate, a first MIMO antenna and a second MIMO antenna. The first MIMO antenna is mounted on the dielectric substrate. The second MIMO antenna is mounted on the dielectric substrate and beside the first MIMO antenna. The first MIMO antenna and the second MIMO antenna are configured to wirelessly access a set of first signals.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
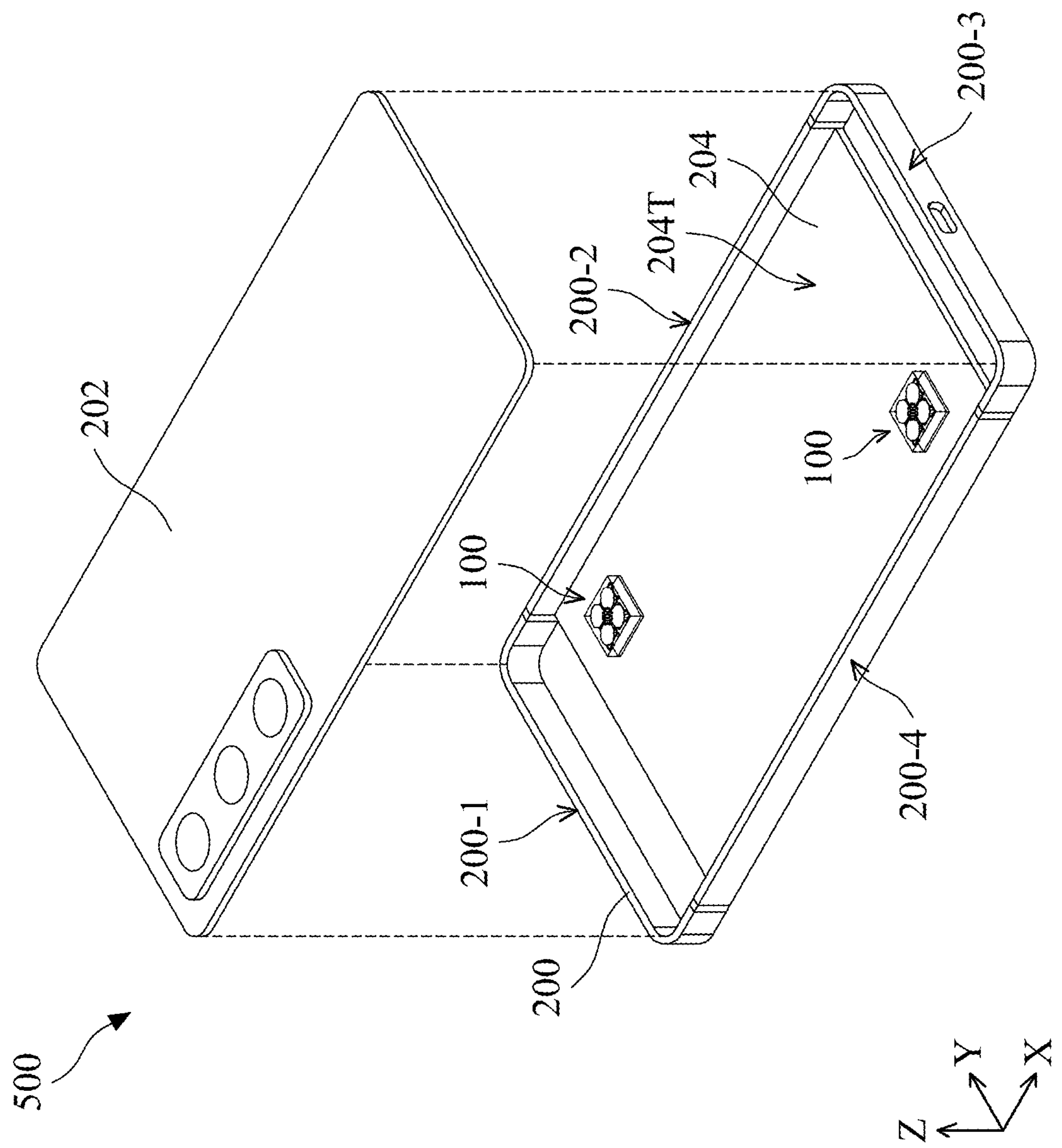
FIG. 1 is an exploded view of a MIMO antenna system in accordance with some embodiments of the disclosure.

The inventive concept is described fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. Also, the drawings as illustrated are only schematic and are non-limiting. In the drawings, the size of some of the elements may be exaggerated for illustrative purposes and not drawn to scale. The dimensions and the relative dimensions do not correspond to actual dimensions in the practice of the invention FIG. 1 is an exploded view of a MIMO antenna system 500 (including MIMO antenna systems 500A, 500B, 500C, 500D, 500E, 500F, 500G, 500H and 500K in the following figures) in accordance with some embodiments of the disclosure. In some embodiments, the MIMO antenna system 500 is applicable to a handheld device, such as a mobile phone.

As shown in FIG. 1, the MIMO antenna system 500 may include a metal frame 200, a back cover 202, a dielectric substrate 204 and at least two MIMO antennas 100. In some embodiments, the MIMO antenna system 500 may use two M×M MIMO antennas 100 to form a 2M×2M MIMO antenna system, where M is an integer that is greater than 2, or any other suitable number. For example, M is an even integer greater than or equal to 4, such as 4, 6, 8. For example, the MIMO antenna system 500 may use two 4×4 MIMO antennas 100 to form an 8×8 MIMO antenna system.

The metal frame 200 may have a hollow rectangular shape with four sides 200-1, 200-2, 200-3 200-4. The back cover 202 and a transparent cover (not shown) covered by the dielectric substrate 204 may be affixed to opposite sides of the metal frame 200 to form an external housing of the MIMO antenna system 500. The dielectric substrate 204 is disposed inside the external housing and surrounded by the metal frame 200. The dielectric substrate 204 is provided as a carrier and electrical connections for the MIMO antennas 100, display device (not shown) and other electrical components (not shown). In some embodiments, the dielectric substrate 204 includes printed circuit boards (PCBs) including flexible printed circuit (FPC). The dielectric substrate 204 may be made of a material including an organic material or an inorganic material, such as FR4 material, FR5 material, bismaleimide triazine (BT) resin material, glass, ceramic, molding compound, liquid crystal polymer, glass cloth based material, epoxy resin, ferrite, silicon, another applicable material or a combination thereof. In some embodiments, the dielectric substrate 204 further includes electrical routings (not shown) composed of conductive layers and vias (not shown) formed in the dielectric substrate 204 for electrical connections.

The two MIMO antennas 100 (including MIMO antennas 100A, 100B, and 100C in the following figures) are mounted on and electrically connected to the dielectric substrate 204. As shown in FIG. 1, the two MIMO antennas 100 are both mounted on a first surface 204T of the dielectric substrate 204. One MIMO antenna 100 may be arranged beside another MIMO antenna 100.

Figure 2:
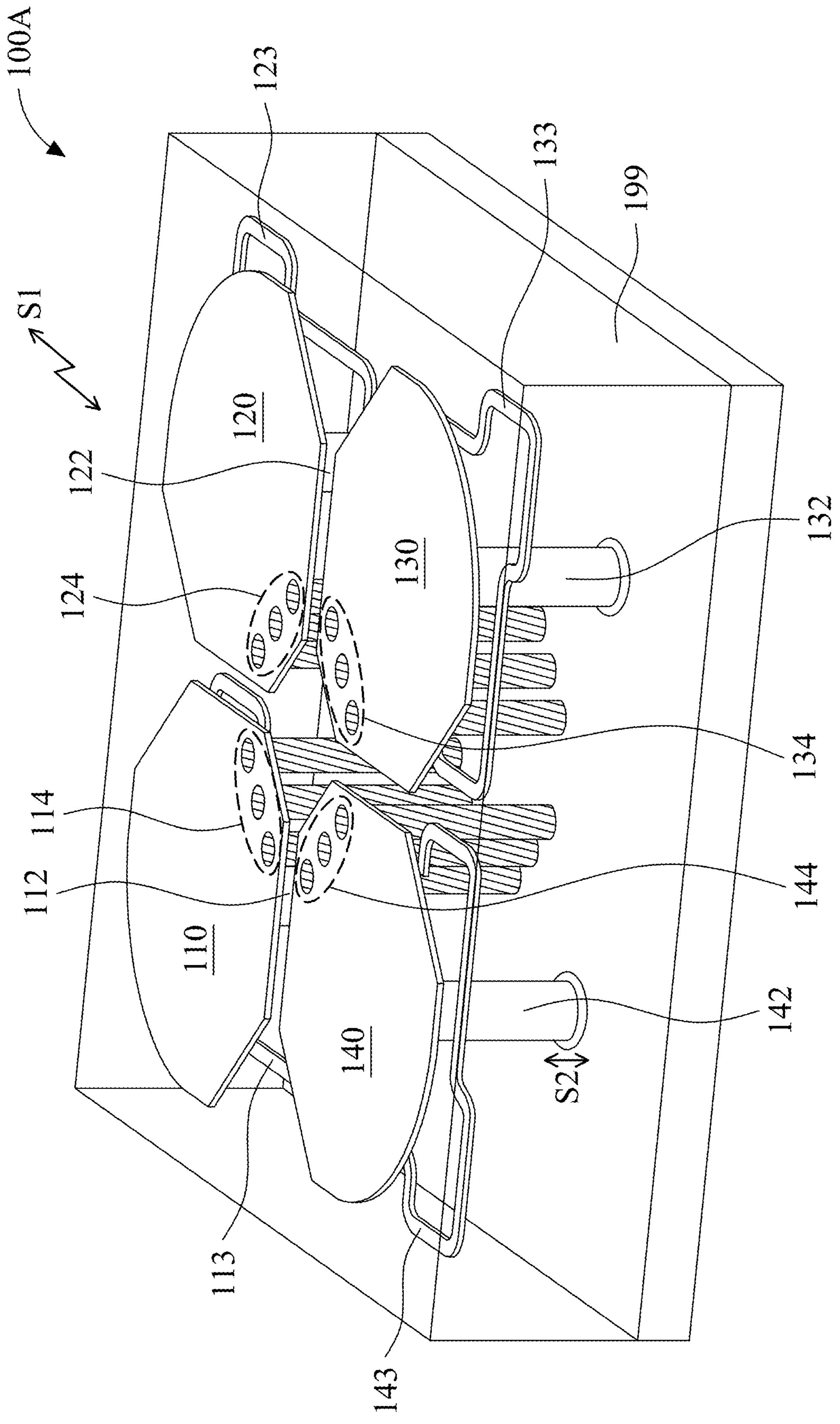
FIG. 2 is a three-dimensional (3D) view of a MIMO antenna of the MIMO antenna system of FIG. 1 in accordance with some embodiments of the disclosure.
Figure 3:
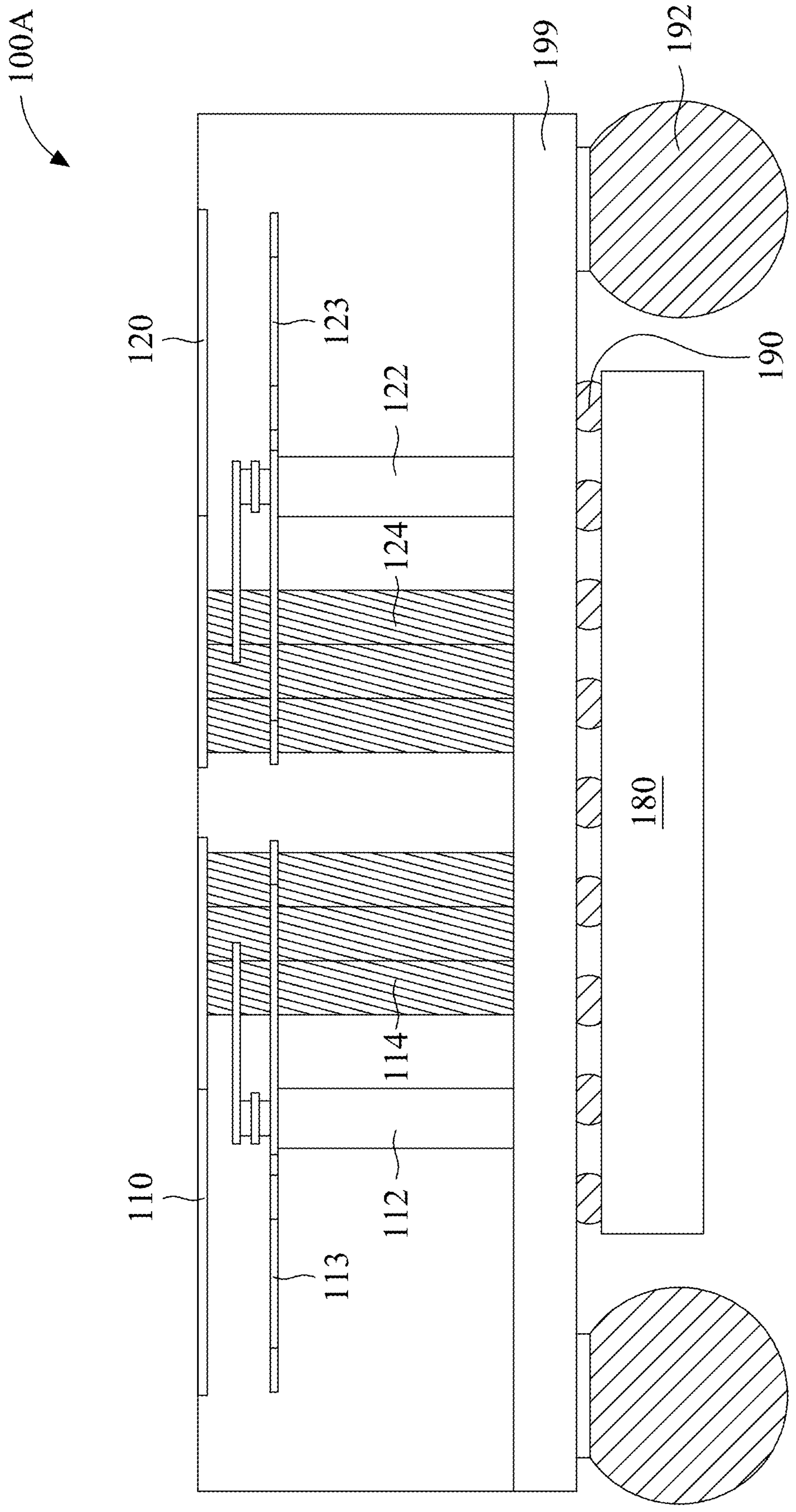
FIG. 3 is a side view of FIG. 2.
Figure 4:
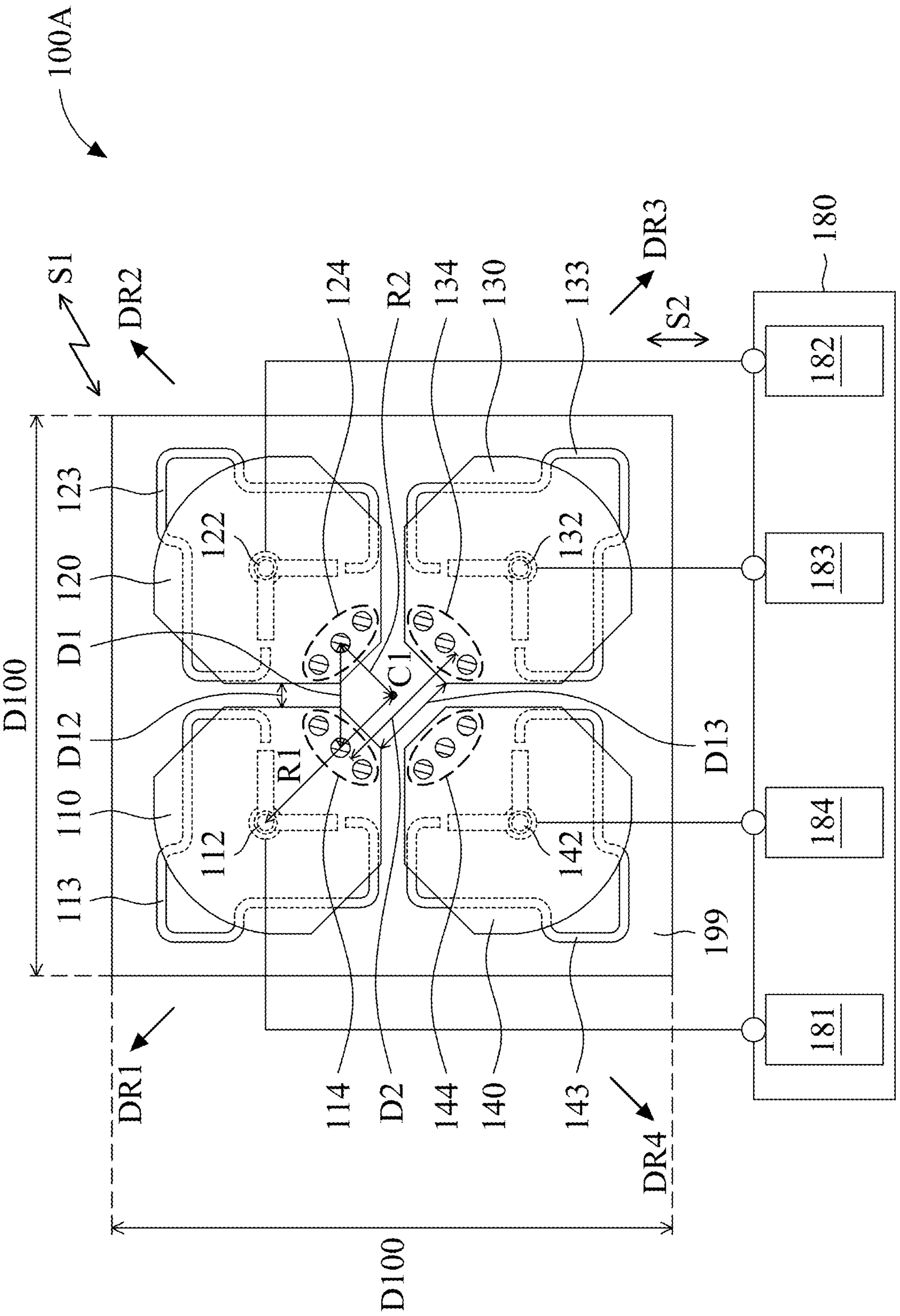
FIG. 4 is a top view of a portion of the of FIG. 1, showing the MIMO antenna of FIG. 2 connected to a processing circuit in accordance with some embodiments of the disclosure.

FIG. 2 is a three-dimensional (3D) view of the MIMO antenna 100A (including MIMO antennas 100A-1, 100A-2 in the following figures) of the MIMO antenna system 500 of FIG. 1 in accordance with some embodiments of the disclosure. FIG. 3 is a side view of FIG. 2. FIG. 4 is a top view of a portion of the of FIG. 1, showing the MIMO antenna 100A of FIG. 2 connected to a processing circuit 180 in accordance with some embodiments of the disclosure.

The MIMO antenna 100A may include M radiators and M feeding points. In some embodiments as shown in FIG. 2 to FIG. 4, M equals to four as an example, and the MIMO antenna 100A may include four radiators 110, 120, 130 and 140, and four feeding elements 112, 122, 132 and 142. The MIMO antenna 100A is mounted on the dielectric substrate 204 by conductive bump structures 192.

In FIG. 2 to FIG. 4, M is 4 as an example. In some embodiments, M is an integer that is greater than 2, such as 3, 4, 6, 8, or any other suitable number. In some embodiments, the number of radiators may be equal to the number of feeding elements. If M equals 4, the MIMO antenna 100A may be used in a 4×4 MIMO antenna device. If M equals 6, the MIMO antenna 100A may be used in a 6×6 MIMO antenna device. If M equals 8, the MIMO antenna 100A may be used in an 8×8 MIMO antenna device. The MIMO antenna 100A may be utilized in a MIMO antenna device for the simultaneous transmission and reception of multiple data streams, enhancing the data capacity and speed of wireless networks. It is also suitable for high-frequency applications such as Wi-Fi, LTE, 4G, 5G and 6G.

The MIMO antenna 100A The MIMO antenna 100A may wirelessly access a set of first signals S1. More specifically, the M radiators 110, 120, 130 and 140 (where M=4 in this example) may wirelessly access the set of first signals S1. The feeding elements 112, 122, 132 and 142 may be formed below the M radiators 110, 120, 130 and 140. The M feeding elements 112, 122, 132 and 142 may be connected to the processing circuit 180 by conductive bump structures 190. The processing circuit 180 may include a radio-frequency integrated circuit (RFIC). The M feeding elements 112, 122, 132 and 142 may access a set of second signals S2 between the M feeding elements 112, 122, 132 and 142 and the processing circuit 180, where the second signals S2 may be corresponding to the first signals S1. The first signals S1 may be millimeter-wave (mmWave) signals, and may have a frequency greater than 6 GHz.

As shown in FIG. 4, the processing circuit 180 may include M transceivers connected to the M feeding elements respectively. In FIG. 4, M equals to four as an example, and the processing circuit 180 may include four transceivers 181, 182, 183 and 184 connected to the feeding elements 112, 122, 132 and 142 respectively.

Each of the M feeding elements 112, 122, 132 and 142 may be formed below a corresponding radiator of the M radiators 110, 120, 130 and 140. The feeding elements 112 may be formed below the radiator 110 and coupled to the radiator 110. The feeding elements 122 may be formed below the radiator 120 and coupled to the radiator 120. The feeding elements 132 may be formed below the radiator 130 and coupled to the radiator 130. The feeding elements 142 may be formed below the radiator 140 and coupled to the radiator 140. Here, the feeding element and the radiator may be coupled through physical and/or wireless coupling.

The MIMO antenna 100A may also include parasitic elements 113, 123, 133 and 143 formed below the radiators 110, 120, 130 and 140 respectively for improving the impedance, bandwidth, and/or gain of the MIMO antenna 100A.

The MIMO antenna 100A may further include M groups of conductive vias. In FIG. 2 to FIG. 4, M is four as an example, and the M groups of conductive vias 114, 124, 134 and 144 may be connected to the radiators 110, 120, 130 and 140 respectively. Each of the conductive vias may connected between a ground plane 199 and a corresponding radiator. The $m^{th}$ groups of conductive via may be connected to the $m^{th}$ radiator correspondingly. The conductive vias may be used for structure support, heat dissipation, and/or other electrical-related requirements. In some embodiments, m is an integer, and $0<m\leq M$.

In some embodiments, the M feeding elements (e.g., the feeding elements 112, 122, 132 and 142) may not be connected to the ground plane 199. Instead, the M feeding elements (e.g., the feeding elements 112, 122, 132 and 142)

may pass through the holes of the ground plane 199 to be connected to the processing circuit 180.

As shown in FIG. 4, the M radiators (e.g., the radiators 110, 120, 130, and 140) may be arranged symmetrically around a reference point C1. In the top view, a feeding element (e.g., the feeding element 112) and the reference point C1 may be separated by a first distance R1. A conductive via of the M groups of conductive vias (e.g., one of the conductive vias 124) and the reference point C1 may be separated by a second distance R2. The first distance R1 may be greater than the second distance R2. Through such an arrangement, interference may be reduced and the effect of exciting the antenna may be improved.

The first signals S1 shown in FIG. 2 to FIG. 4 may have a wavelength (represented as A). In some embodiments, the second distance R2 may be between 0.04 times the wavelength and 0.25 times of wavelength. As shown in FIG. 4, the conductive vias of the first group of conductive vias 114 and the second group of conductive vias 124 may be separated by a distance D1. The conductive vias of the first group of conductive vias 114 and the third group of conductive vias 134 may be separated by a distance D2. According to the embodiments, two vias of different groups of vias may be separated by a distance, and the distance may be between 0.05 times the wavelength and 0.25 times the wavelength, that is, between 0.05% and 0.252. For example, each of the distances D1 and D2 may be between 0.05% and 0.252.

In some embodiments, two of the M radiators (e.g. the radiators 110, 120, 130, and 140 in FIG. 4) may be separated by a distance, where the distance may be between 0.0015 times the wavelength and 0.25 times the wavelength, that is, between 0.00152 and 0.252. For example, the radiators 110 and 120 may be separated by a distance D12, the radiators 110 and 130 may be separated by a distance D13, and each of the distances D12 and D13 may be between 0.0015% and 0.25%.

In some embodiments, the diameter D100 of the MIMO antenna 100A is less than or equal to 0.5 times the wavelength that is, less than or equal to 0.52.

In FIG. 4, when only radiator 110 is excited and transceiver 181 is used to transmit and receive signals, the radiation pattern may approximately correspond to direction DR1. When only radiator 120 is excited and transceiver 182 is used to transmit and receive signals, the radiation pattern may approximately correspond to direction DR2. When only radiator 130 is excited and transceiver 183 is used to transmit and receive signals, the radiation pattern may approximately correspond to direction DR3. When only radiator 140 is excited and transceiver 184 is used to transmit and receive signals, the radiation pattern may approximately correspond to direction DR4. The directions DR1, DR2, DR3, DR4 may also called polarization directions of the radiators 110, 120, 130, 140.

For example, in a 4×4 MIMO antenna, the angle between direction DR1 and direction DR2 may be approximately 90 degrees, the angle between direction DR2 and direction DR3 may be approximately 90 degrees, the angle between direction DR3 and direction DR4 may be approximately 90 degrees, and the angle between direction DR4 and direction DR1 may be approximately 90 degrees. That is to say, the polarization directions of any two adjacent radiators 110, 120, 130, and 140 of the MIMO antenna 100A-1 are orthogonal. The orthogonal polarization direction between the adjacent radiators may help in mitigating interference between signals.

In FIG. 4, the position of the processing circuit 180 is not a precise position; it merely indicates that the feeding elements may be connected to the processing circuit 180. In FIG. 4, the directions DR1, DR2, DR3, DR4 corresponding to the radiation patterns may be the directions determined when viewing the antenna from the top view. The directions corresponding to the radiation patterns may be determined by the arrangements of the radiators.

In some embodiments, each of the M radiators (e.g. the radiators 110, 120, 130, and 140 in FIG. 4) in the MIMO antenna 100A may create uncorrelated signals by pattern diversity. Two adjacent M radiators (e.g. the radiators 110, 120, 130, and 140 in FIG. 4) in the MIMO antenna 100A may create uncorrelated signals by polarization diversity. In some embodiments, the MIMO antenna 100A has a small size (diameter).

In some embodiments, the MIMO antenna system 500 may include one M×M MIMO antenna having M radiators and M feeding elements and one N×N MIMO antenna having N radiators and N feeding elements in different positions to form a (M+N)×(M+N) MIMO antenna system, where each of M and N is a positive integer greater than (or equal to) 2, or any other suitable number. In some embodiments, N is equal to M. When the MIMO antenna system 500 is applicable to a mobile phone, the performance with hand blockage is improved.

Figure 5:
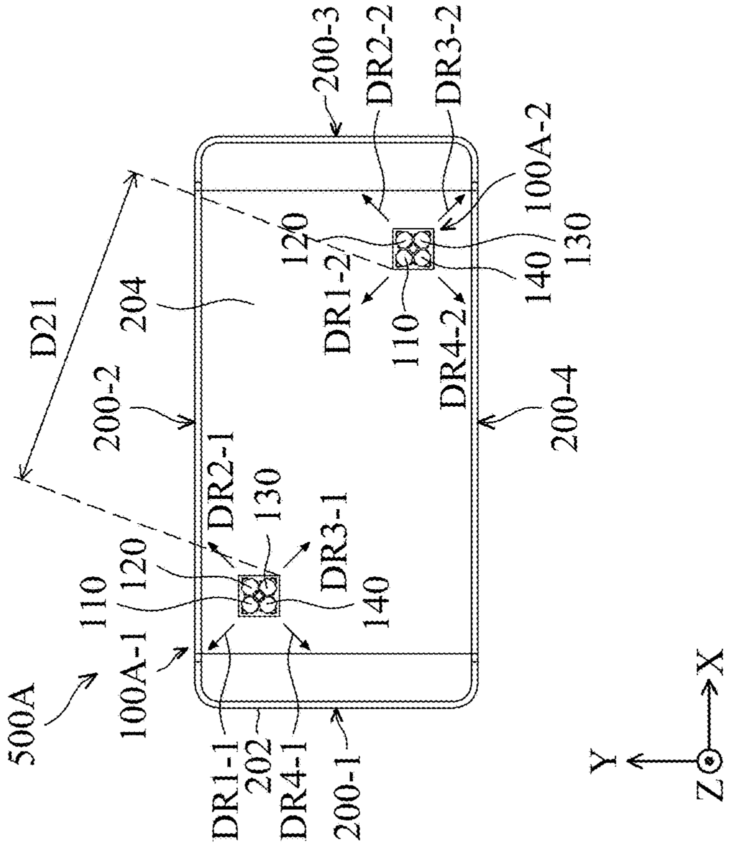
FIG. 5 is a top view of a MIMO antenna system including at least two MIMO antennas of FIG. 2 in accordance with some embodiments of the disclosure, showing the arrangements of the MIMO antennas.

FIG. 5 is a top view of the MIMO antenna system 500A including two MIMO antennas 100A-1, 100A-2 of FIG. 2 in accordance with some embodiments of the disclosure, showing the arrangements of the MIMO antennas 100A-1, 100A-2. In some embodiments, the MIMO antennas 100A-1, 100A-2 may be disposed at different positions of the dielectric substrate 204. For example, the MIMO antennas 100A-1, 100A-2 may be disposed close to diagonal corners of the metal frame 200. More specifically, the MIMO antenna 100A-1 may be disposed close to the top-left corner where the sides 200-1, 200-2 of the metal frame 200 meet. The MIMO antenna 100A-2 may be disposed close to the bottom-right corner where the sides 200-3, 200-4 of the metal frame 200 meet.

In this embodiment, the MIMO antennas 100A-1, 100A-2 are identical. The MIMO antennas 100A-1, 100A-2 both include M radiators (where M=4 in this example) arranged around the reference point C1 (FIG. 4). For example, the MIMO antennas 100A-1, 100A-2 both include the radiators 110, 120, 130, and 140). The M radiators (e.g., the radiators 110, 120, 130, and 140) of the MIMO antennas 100A-1, 100A-2 are planar conductors extending parallel to XY-plane. In addition, the M radiators (e.g., the radiators 110, 120, 130, and 140) of the MIMO antennas 100A-1, 100A-2 may be both facing the positive Z-direction. Therefore, the angle between the facing directions (i.e., the positive Z-direction) of the MIMO antennas 100A-1, 100A-2 is 0 degrees.

In some embodiments, the M radiators (e.g., the radiators 110, 120, 130, and 140) of each of the MIMO antennas 100A-1, 100A-2 may have different polarization directions, form the first polarization direction to the $M^{th}$ polarization direction. In addition, the angle between the polarization directions of any two adjacent radiators of the same MIMO antenna 100A-1 (or the MIMO antenna 100A-2) is 360/M degrees. As shown in FIG. 5, when the MIMO antennas 100A-1, 100A-2 are 4×4 MIMO antennas, the MIMO antenna 100A-1 at the top-left corner of the metal frame 200 has four polarization directions DR1-1, DR2-1, DR3-1, and DR4-1 in a clockwise direction. The MIMO antenna 100A-2 at the bottom-right corner of the metal frame 200 has four polarization directions DR1-2, DR2-2, DR3-2, and DR4-2 in a clockwise direction. In addition, the polarization direction DR1-1 of the MIMO antenna 100A-1 may be corresponding to the polarization direction DR1-2 of the MIMO antenna 100A-2. In each of the MIMO antennas 100A-1, 100A-2, the angle between the polarization directions of any two adjacent radiators 110, 120, 130, and 140 is 90 degrees. That is to say, any two adjacent radiators 110, 120, 130, and 140 of each of the MIMO antennas 100A-1, 100A-2 are orthogonal.

In some embodiments, the MIMO antennas 100A-1, 100A-2 disposed in different positions of the MIMO antenna system 500A may have the same polarization directions. In this embodiment, the polarization direction of the corresponding radiator of the MIMO 100A-1 antenna is parallel to the polarization direction of the corresponding radiator of the MIMO antenna 100A-2. For example, the polarization directions DR1-1, DR2-1, DR3-1, DR4-1 of the radiators 110, 120, 130, and 140 of the MIMO antenna 100A-1 are parallel to the corresponding polarization direction DR1-2, DR2-2, DR3-2, DR4-2 of the radiators 110, 120, 130, and 140 of the MIMO antenna 100A-2, respectively.

Alternatively, the one of the polarization directions of the corresponding radiators of MIMO antenna 100A-1 is parallel any of the polarization directions of the corresponding radiators of MIMO antenna 100A-2. For example, the angle between the first polarization directions of the radiators 110 of the MIMO antennas 100A-1, 100A-2 is A (360/M) degrees, where A is a positive integer from 1 to M ($1 \leq A \leq M$). For example, when the MIMO antenna 100A-2 is rotated 90, 180 or 270 degrees in a clockwise direction, the angle between the polarization direction DR1-1 of the radiator 110 of the MIMO antenna 100A-1 and the polarization direction DR1-2 of the radiator 110 of the MIMO antenna 100A-2 is 90, 180 or 270 degrees.

In some embodiments, the MIMO antennas 100A-1, 100A-2 having 4 radiators may be used (downgraded) as 2×2 MIMO antennas, and form a 4×4 MIMO antenna system 500A. For each of the two MIMO antennas 100A-1, 100A-2, only two of the radiators are selected to transmit and receive signals. The polarization directions of the selected radiators of the MIMO antenna 100A-1 may be the same as or different to the polarization directions of the selected radiators of the MIMO antenna 100A-2.

For example, the radiator 110 having the polarization direction DR1-1 and the radiator 120 having the polarization direction DR2-1 of the MIMO antenna 100A-1 are selected to form a 2×2 MIMO antenna 100A-1. In addition, the radiator 130 having the polarization direction DR3-2 and the radiator 140 having the polarization direction DR4-2 of the MIMO antenna 100A-2 are selected to form a 2×2 MIMO antenna 100A-2. The two 2×2 MIMO antennas 100A-1, 100A-2 form a 4×4 MIMO antenna system 500A transmitting and receiving signals in four polarization directions DR1-1, DR2-1, DR3-2, DR4-2.

For example, the radiator 110 having the polarization direction DR1-1 and the radiator 120 having the polarization direction DR2-1 of the MIMO antenna 100A-1 are selected to form a 2×2 MIMO antenna 100A-1. In addition, the radiator 110 having the polarization direction DR1-2 and the radiator 120 having the polarization direction DR2-2 of the MIMO antenna 100A-2 are selected to form a 2×2 MIMO antenna 100A-2. The two 2×2 MIMO antennas 100A-1, 100A-2 form a 4×4 MIMO antenna system 500A transmitting and receiving signals in four polarization directions DR1-1, DR2-1, DR1-2, DR2-2.

For example, the radiator 110 having the polarization direction DR1-1 and the radiator 130 having the polarization direction DR3-1 of the MIMO antenna 100A-1 are selected to form a 2×2 MIMO antenna 100A-1. In addition, the radiator 120 having the polarization direction DR2-2 and the radiator 140 having the polarization direction DR4-2 of the MIMO antenna 100A-2 are selected to form a 2×2 MIMO antenna 100A-2. The two 2×2 MIMO antennas 100A-1, 100A-2 form a 4×4 MIMO antenna system 500A transmitting and receiving signals in four polarization directions DR1-1, DR3-1, DR2-2, DR4-2.

For example, the radiator 110 having the polarization direction DR1-1 and the radiator 130 having the polarization direction DR3-1 of the MIMO antenna 100A-1 are selected to form a 2×2 MIMO antenna 100A-1. In addition, the radiator 110 having the polarization direction DR1-2 and the radiator 130 having the polarization direction DR3-2 of the MIMO antenna 100A-2 are selected to form a 2×2 MIMO antenna 100A-2. The two 2×2 MIMO antennas 100A-1, 100A-2 form a 4×4 MIMO antenna system 500A transmitting and receiving signals in four polarization directions DR1-1, DR3-1, DR1-2, DR3-2.

In some embodiments, the MIMO antennas 100A-1, 100A-2 of the MIMO antenna system 500A may create uncorrelated signals mainly by spatial diversity.

In some embodiments, a distance D21 between the MIMO antennas 100A-1, 100A-2 in the same MIMO antenna system 500A is between 0.5 times the first wavelength and 8 times the first wavelength.

Figure 6:
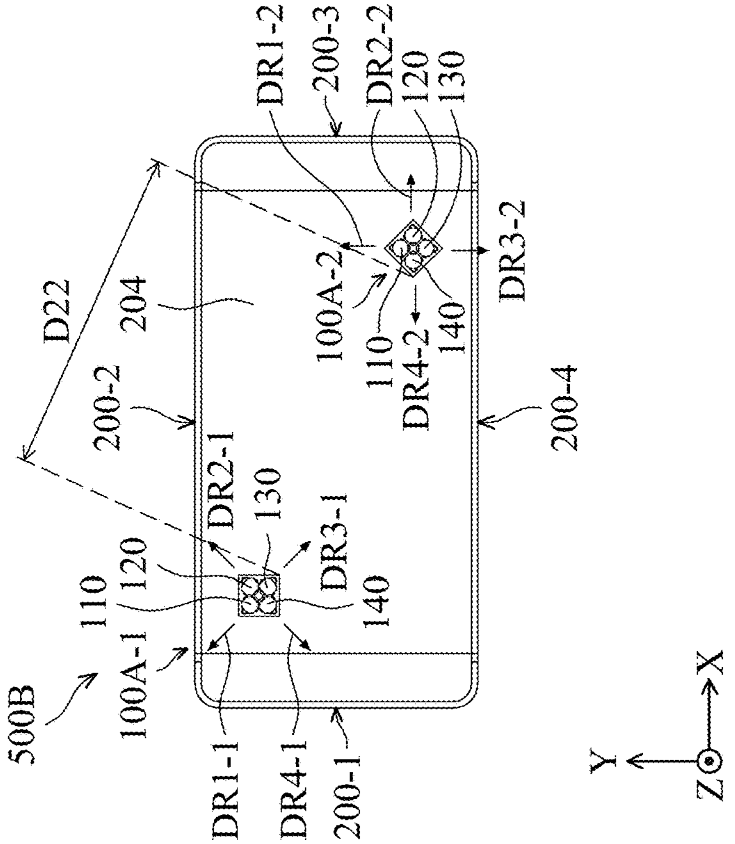
FIG. 6 is a top view of a MIMO antenna system including at least two MIMO antennas of FIG. 2 in accordance with some embodiments of the disclosure, showing the arrangements of the MIMO antennas.

FIG. 6 is a top view of the MIMO antenna system 500B including two MIMO antennas 100A of FIG. 2 in accordance with some embodiments of the disclosure, showing the arrangements of the MIMO antennas 100A-1, 100A-2. Elements of the embodiments hereinafter, that are the same or similar as those previously described with reference to FIG. 5, are not repeated for brevity.

As shown in FIGS. 5 and 6, the difference between the MIMO antenna system 500A and the MIMO antenna system 500B at least includes that the MIMO antennas 100A-1, 100A-2 disposed in different positions of the MIMO antenna system 500B may have the different polarization directions. For example, compared with the MIMO antenna system 500A, the MIMO antenna 100A-2 of the MIMO antenna system 500B may be rotated 45 degrees in a clockwise direction. Therefore, the polarization directions DR1-1, DR2-1, DR3-1, DR4-1 of the radiators 110, 120, 130, and 140 of the MIMO antenna 100A-1 are different to the corresponding polarization direction DR1-2, DR2-2, DR3-2, DR4-2 of the radiators 110, 120, 130, and 140 of the MIMO antenna 100A-2. In this embodiment, the angle between the polarization direction DR1-1 of the radiator 110 of the MIMO antenna 100A-1 and the polarization direction DR1-2 of the radiator 110 of the MIMO antenna 100A-2 is less than (360/M) degrees, such as 90 degrees (where M=4 in this example). For example, the angle between the polarization direction DR1-1 of the radiator 110 of the MIMO antenna 100A-1 and the polarization direction DR1-2 of the radiator 110 of the MIMO antenna 100A-2 is 45 degrees as shown in FIG. 6

In some embodiments, the MIMO antennas 100A-1, 100A-2 of the MIMO antenna system 500B may create uncorrelated signals mainly by spatial diversity and polarization diversity. Through such an arrangement, the polarization directions of the MIMO antennas 100A-1, 100A-2 may help in mitigating interference between signals, so that the distance D22 between the MIMO antennas 100A-1, 100A-2 of the MIMO antenna system 500B can be further reduced (e.g., the distance D22 shown in FIG. 6 may be shorter than the distance D21 shown in FIG. 2).

In some embodiments in which the frequency of the first signals S1 is greater than or equal to 6 GHz, the MIMO antennas 100A-1, 100A-2 in the same MIMO antenna system 500 may be spaced apart each other by distances small than or equal to 8 times the wavelength of the first signals S1, according to the requirements of design. In addition, the MIMO antennas 100A-1, 100A-2 in the same MIMO antenna system 500 may be disposed in arbitrary positions of the dielectric substrate 204, according to the requirements of design.

Figure 7C:
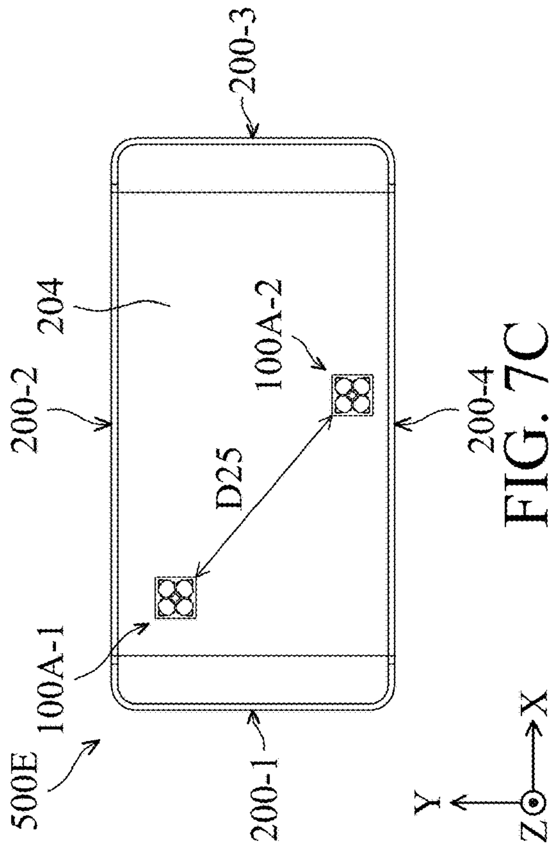
FIGS. 7A, 7B and 7C are top views of a MIMO antenna system including at least two MIMO antennas of FIG. 2 in accordance with some embodiments of the disclosure, showing the arrangements of the MIMO antennas.
Figure 7A:
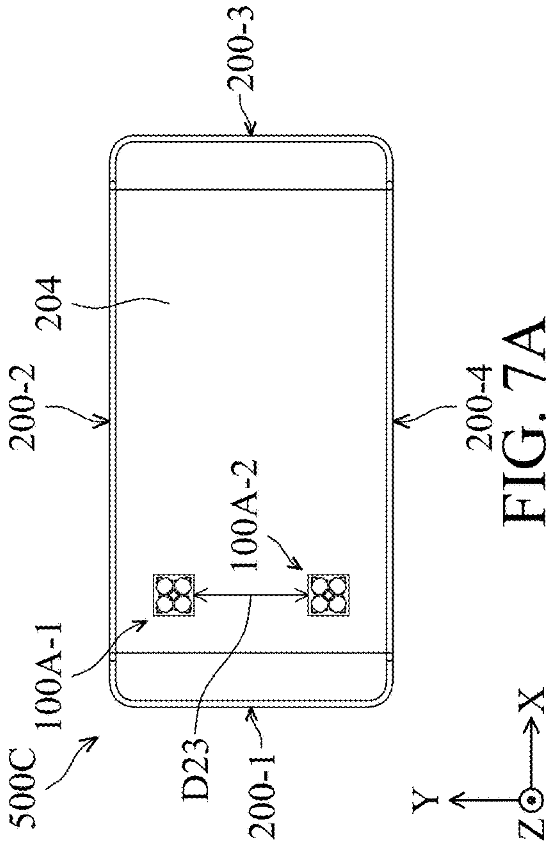
Figure 7B:
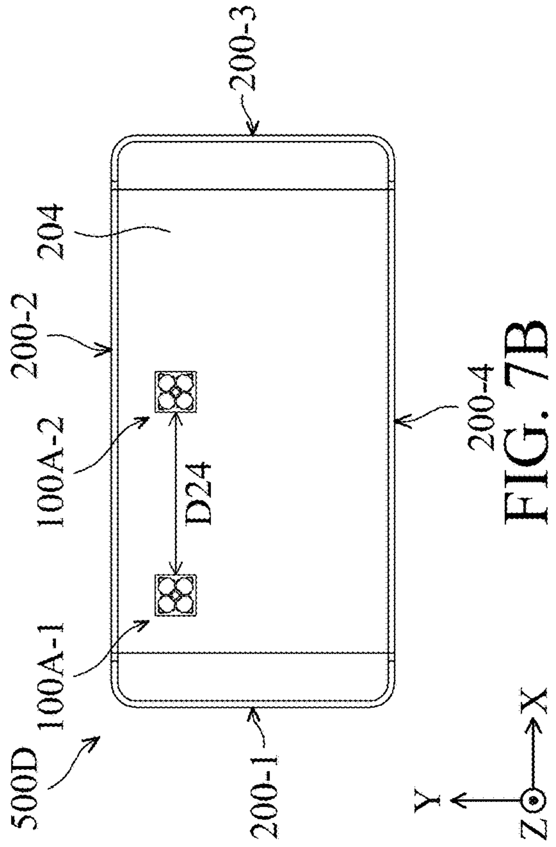

FIGS. 7A, 7B and 7C are top views of MIMO antenna systems 500C, 500D, 500E including at least two MIMO antennas 500A-1, 500A-2 of FIG. 2 in accordance with some embodiments of the disclosure, showing the arrangements of the MIMO antennas 500A-1, 500A-2. Elements of the embodiments hereinafter, that are the same or similar as those previously described with reference to FIGS. 5 and 6, are not repeated for brevity.

As shown in FIGS. 5 and 7A, the difference between the MIMO antenna system 500A and the MIMO antenna system 500C at least includes that the MIMO antenna 500A-2 of the MIMO antenna system 500C is disposed close to a corner where the sides 200-4, 200-1 meet. Therefore, the MIMO antennas 500A-1, 500A-2 of the MIMO antenna system 500C are disposed close to adjacent corners (e.g., the top-left corner and the bottom-left corner) share one side (e.g., the side 200-1) of the metal frame 200. In addition, a distance D23 between the MIMO antennas 100A-1, 100A-2 in the same MIMO antenna system 500C is less than a distance D21 between the MIMO antennas 100A-1, 100A-2 in the same MIMO antenna system 500A (FIG. 5). Furthermore, the distance D23 is still in a range between 0.5 times the first wavelength and 8 times the wavelength of the first signals S1 (represented as 2). For example, when the distance D21 is 82, the distance D23 is 22.

As shown in FIGS. 5 and 7B, the difference between the MIMO antenna system 500A and the MIMO antenna system 500D at least includes that the MIMO antenna 500A-2 of the MIMO antenna system 500D is disposed close to the side 200-2 of the metal frame 200. Therefore, the MIMO antennas 500A-1, 500A-2 of the MIMO antenna system 500D are disposed close to the same side (e.g., the side 200-2) of the metal frame 200. In addition, a distance D24 between the MIMO antennas 100A-1, 100A-2 in the same MIMO antenna system 500C is less than the distance D21 between the MIMO antennas 100A-1, 100A-2 in the same MIMO antenna system 500A (FIG. 5). Furthermore, the distance D24 is still in a range between 0.5 times the first wavelength and 8 times the wavelength of the first signals S1 (represented as A). For example, when the distance D21 is 82, the distance D24 is 42.

As shown in FIGS. 5 and 7C, the difference between the MIMO antenna system 500A and the MIMO antenna system 500E at least includes that the MIMO antenna 500A-2 of the MIMO antenna system 500E is disposed close to the middle of the side 200-4 of the metal frame 200 (and away from the bottom-right corner where the sides 200-3, 200-4 of the metal frame 200 meet). Therefore, the MIMO antennas 500A-1, 500A-2 of the MIMO antenna system 500E are disposed close to the opposite sides (e.g., the side 200-2) of the metal frame 200. In addition, a distance D25 between the MIMO antennas 100A-1, 100A-2 in the same MIMO antenna system 500E is less than the distance D21 between the MIMO antennas 100A-1, 100A-2 in the same MIMO antenna system 500A (FIG. 5). Furthermore, the distance D25 is still in a range between 0.5 times the first wavelength and 8 times the wavelength of the first signals S1 (represented as 2). For example, when the distance D21 is 82, the distance D25 is 62.

In some embodiments, the MIMO antennas 100A-1, 100A-2 of the MIMO antenna systems 500C, 500D, 500E may create uncorrelated signals mainly by spatial diversity.

In some embodiments, the radiators 110, 120, 130, and 140 of the MIMO antennas 100A-1, 100A-2 in the same MIMO antenna system may extend in parallel planes but face opposite directions.

Figure 8:
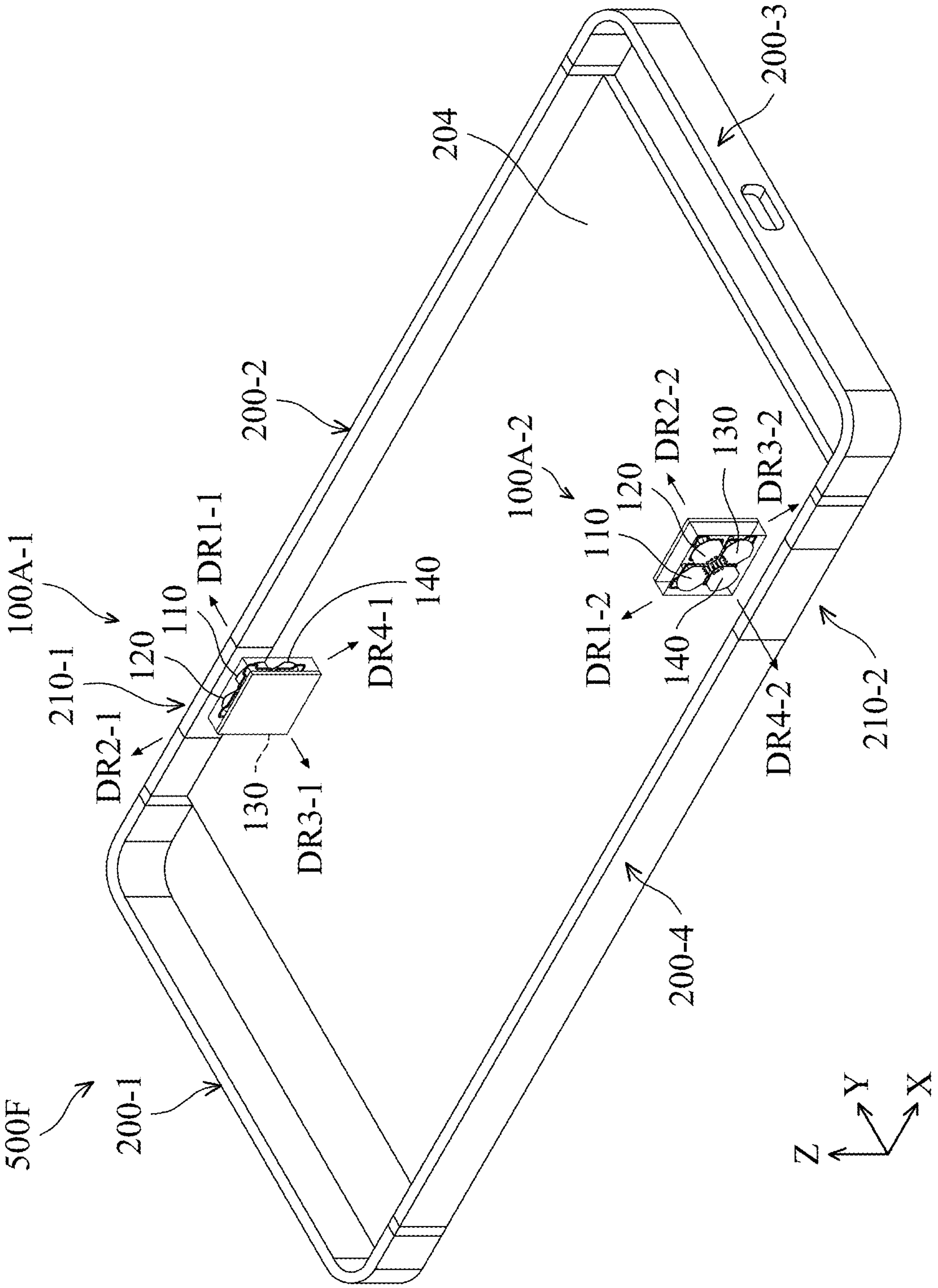
FIG. 8 is a three-dimensional (3D) view of a MIMO antenna system including at least two MIMO antennas of FIG. 2 in accordance with some embodiments of the disclosure, showing the arrangements of the MIMO antennas.

FIG. 8 is a three-dimensional (3D) view of a MIMO antenna system 500F including at least two MIMO antennas 100A-1, 100A-2 of FIG. 2 in accordance with some embodiments of the disclosure, showing the arrangements of the MIMO antennas 100A-1, 100A-2. Elements of the embodiments hereinafter, that are the same or similar as those previously described with reference to FIGS. 5, 6 and 7A-7C, are not repeated for brevity.

As shown in FIGS. 5 and 8, the difference between the MIMO antenna system 500A and the MIMO antenna system 500F at least includes that the radiators 110, 120, 130, and 140 of the MIMO antennas 100A-1, 100A-2 of the MIMO antenna system 500F extending parallel to XZ-plane. In addition, the radiators 110, 120, 130, and 140 of the MIMO antennas 100A-1, 100A-2 in the same MIMO antenna system may face opposite directions. For example, the M radiators (e.g., the radiators 110, 120, 130, and 140) of the MIMO antenna 100A-1 may be facing the positive Y-direction. The M radiators (e.g., the radiators 110, 120, 130, and 140) of the MIMO antenna 100A-2 may be in the negative Y-direction. Therefore, the angle between the facing direction (e.g., the positive Y-direction) of the MIMO antennas 100A-1 and the facing direction (e.g., the negative Y-direction) of the MIMO antenna 100A-2 is 180 degrees.

In some embodiments, the MIMO antennas 100A-1, 100A-2 disposed in different positions of the MIMO antenna system 500F may have the same polarization directions. In this embodiment, the polarization direction of the corresponding radiator of the MIMO 100A-1 antenna is parallel to the polarization direction of the corresponding radiator of the MIMO antenna 100A-2. For example, the polarization directions DR1-1, DR2-1, DR3-1, DR4-1 of the radiators 110, 120, 130, and 140 of the MIMO antenna 100A-1 are parallel to the corresponding polarization direction DR1-2, DR2-2, DR3-2, DR4-2 of the radiators 120, 110, 140, and 130 of the MIMO antenna 100A-2, respectively.

As shown in FIG. 8, the MIMO antenna 100A-1 may be disposed close the side 200-2 of the metal frame 200 and face away from the metal frame 200. In addition, MIMO antenna 100A-2 may be disposed close the side 200-4 of the metal frame 200 and face away from the metal frame 200. In some embodiment, the metal frame 200 may have breakpoints 210-1, 210-2 (filled with the insulating material) corresponding to the MIMO antennas 100A-1, 100A-2 to improve the effectiveness of receiving or transmitting signals of the MIMO antennas 100A-1, 100A-2.

In some embodiments, the MIMO antennas 100A-1, 100A-2 of the MIMO antenna system 500F may create uncorrelated signals mainly by spatial diversity.

Figure 9:
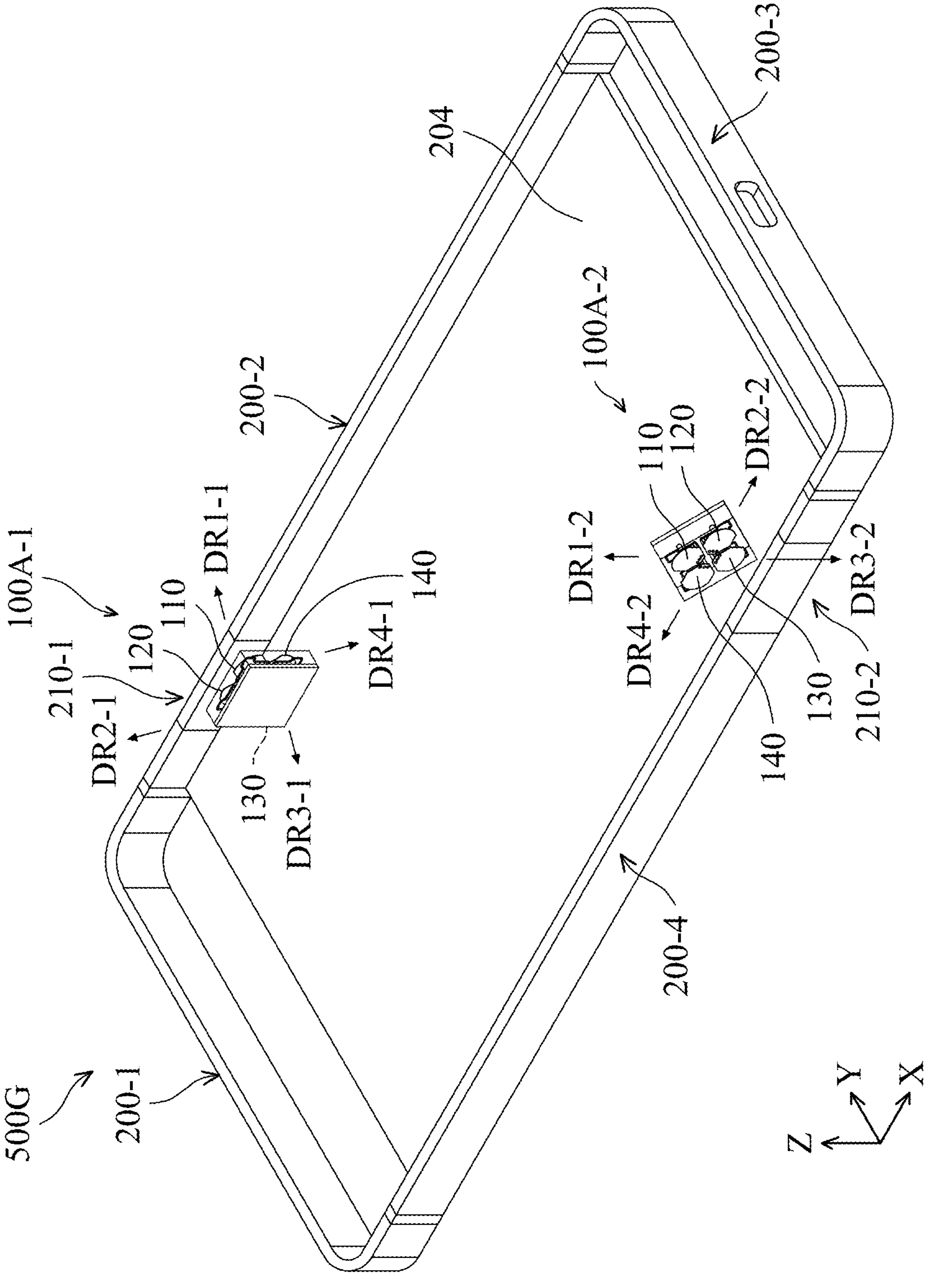
FIG. 9 is a three-dimensional (3D) view of a MIMO antenna system including at least two MIMO antennas of FIG. 2 in accordance with some embodiments of the disclosure, showing the arrangements of the MIMO antennas.

FIG. 9 is a three-dimensional (3D) view of a MIMO antenna system 500G including at least two MIMO antennas 100A-1, 100A-2 of FIG. 2 in accordance with some embodiments of the disclosure, showing the arrangements of the MIMO antennas. Elements of the embodiments hereinafter, that are the same or similar as those previously described with reference to FIGS. 5, 6, 7A-7C and 8, are not repeated for brevity.

As shown in FIGS. 8 and 9, the difference between the MIMO antenna system 500F and the MIMO antenna system 500G at least includes that the polarization directions of the radiators of the MIMO antennas 100A-1 are different from the polarization directions of the radiators of the MIMO antennas 100A-2. For example, compared with the MIMO antenna system 500A, the MIMO antenna 100A-2 of the MIMO antenna system 500B is rotated 45 degrees in a clockwise direction. Therefore, the polarization directions DR1-1, DR2-1, DR3-1, DR4-1 of the radiators 110, 120, 130, and 140 of the MIMO antenna 100A-1 are different to the corresponding polarization direction DR1-2, DR2-2, DR3-2, DR4-2 of the radiators 110, 120, 130, and 140 of the MIMO antenna 100A-2.

In this embodiment, the angle between the polarization direction DR1-1 of the radiator 110 of the MIMO antenna 100A-1 and the polarization direction DR1-2 of the radiator 110 of the MIMO antenna 100A-2 is less than (360/M) degrees, such as 90 degrees (where M=4 in this example). For example, the angle between the polarization direction DR1-1 of the radiator 110 of the MIMO antenna 100A-1 and the polarization direction DR1-2 of the radiator 110 of the MIMO antenna 100A-2 is 45 degrees.

In some embodiments, the MIMO antennas 100A-1, 100A-2 of the MIMO antenna system 500G may create uncorrelated signals mainly by spatial diversity and polarization diversity.

In some embodiments, the radiators 110, 120, 130, and 140 of the MIMO antennas 100A-1, 100A-2 of the same MIMO antenna system may extend in planes perpendicular to each other.

Figure 10:
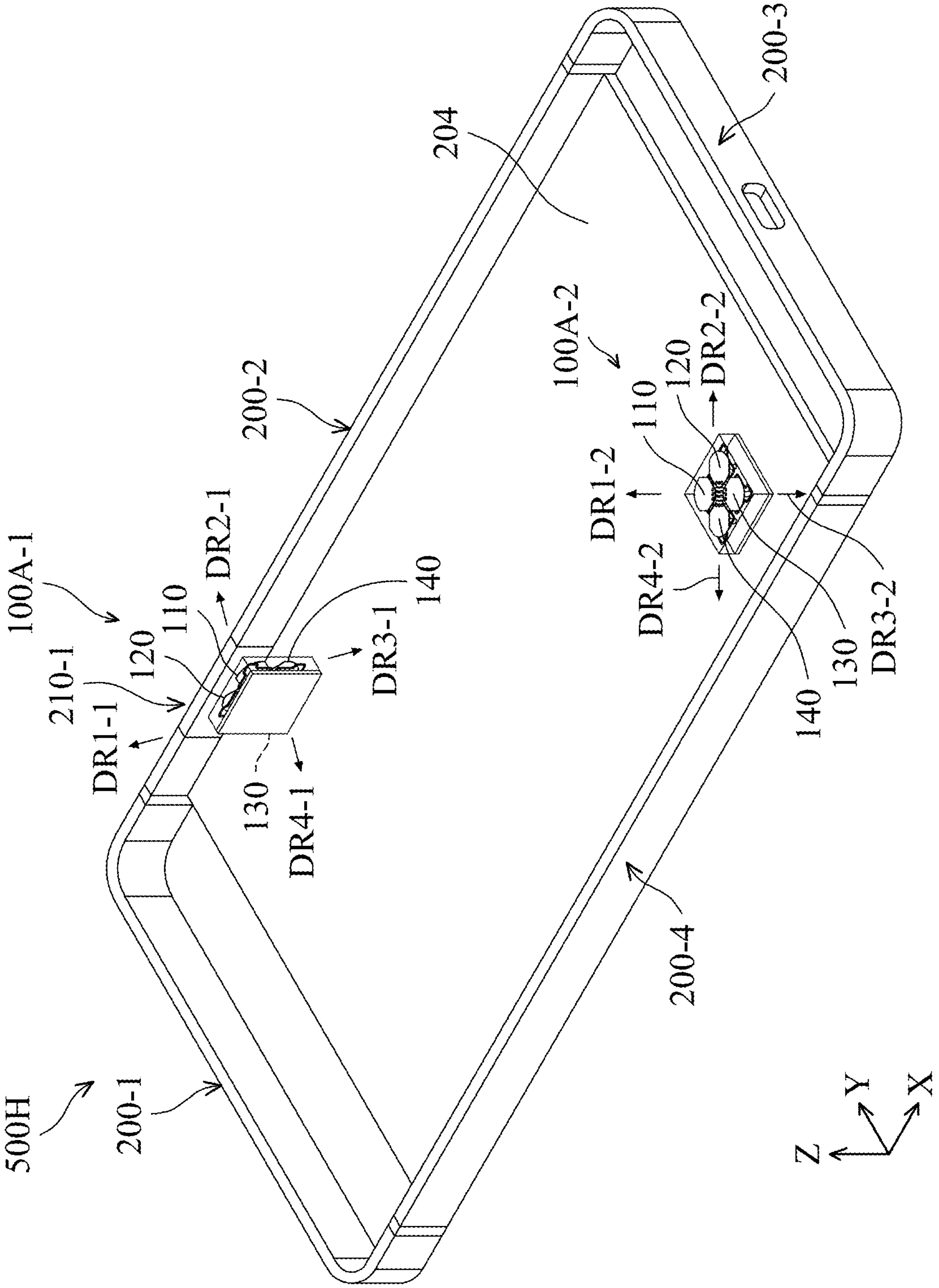
FIG. 10 is a three-dimensional (3D) view of a MIMO antenna system including at least two MIMO antennas of FIG. 2 in accordance with some embodiments of the disclosure, showing the arrangements of the MIMO antennas.

FIG. 10 is a three-dimensional (3D) view of a MIMO antenna system 500H including at least two MIMO antennas 100A-1, 100A-2 of FIG. 2 in accordance with some embodiments of the disclosure, showing the arrangements of the MIMO antennas 100A-1, 100A-2. Elements of the embodiments hereinafter, that are the same or similar as those previously described with reference to FIGS. 5, 6, 7A-7C, 8 and 9, are not repeated for brevity.

As shown in FIGS. 8 and 10, the difference between the MIMO antenna system 500F and the MIMO antenna system 500H at least includes that the radiators 110, 120, 130, and 140 of the MIMO antennas 100A-2 of the MIMO antenna system 500H extending parallel to XY-plane. In addition, the radiators 110, 120, 130, and 140 of the MIMO antennas 100A-1, 100A-2 in the same MIMO antenna system may face orthogonal directions. For example, the M radiators (e.g., the radiators 110, 120, 130, and 140) of the MIMO antenna 100A-1 may be facing the positive Y-direction. The M radiators (e.g., the radiators 110, 120, 130, and 140) of the MIMO antenna 100A-2 may be in the positive Z-direction. Therefore, the angle between the facing direction (e.g., the positive Y-direction) of the MIMO antennas 100A-1 and the facing direction (e.g., the positive Z-direction) of the MIMO antenna 100A-2 is 90 degrees.

As shown in FIG. 10, the MIMO antenna 100A-1 may be disposed close the side 200-2 of the metal frame 200 and face away from the metal frame 200. In this embodiment, the metal frame 200 may have the opening (slots) 210-1 corresponding to the MIMO antenna 100A-1 to improve the effectiveness of receiving or transmitting signals of the MIMO antennas 100A-1.

In some embodiments, the MIMO antennas 100A-1, 100A-2 of the MIMO antenna system 500H may create uncorrelated signals mainly by spatial diversity and polarization diversity.

In some embodiments, one MIMO antenna 100A-1 is vertically stacked on another MIMO antenna 100A-2 of the same MIMO antenna system.

Figure 11:
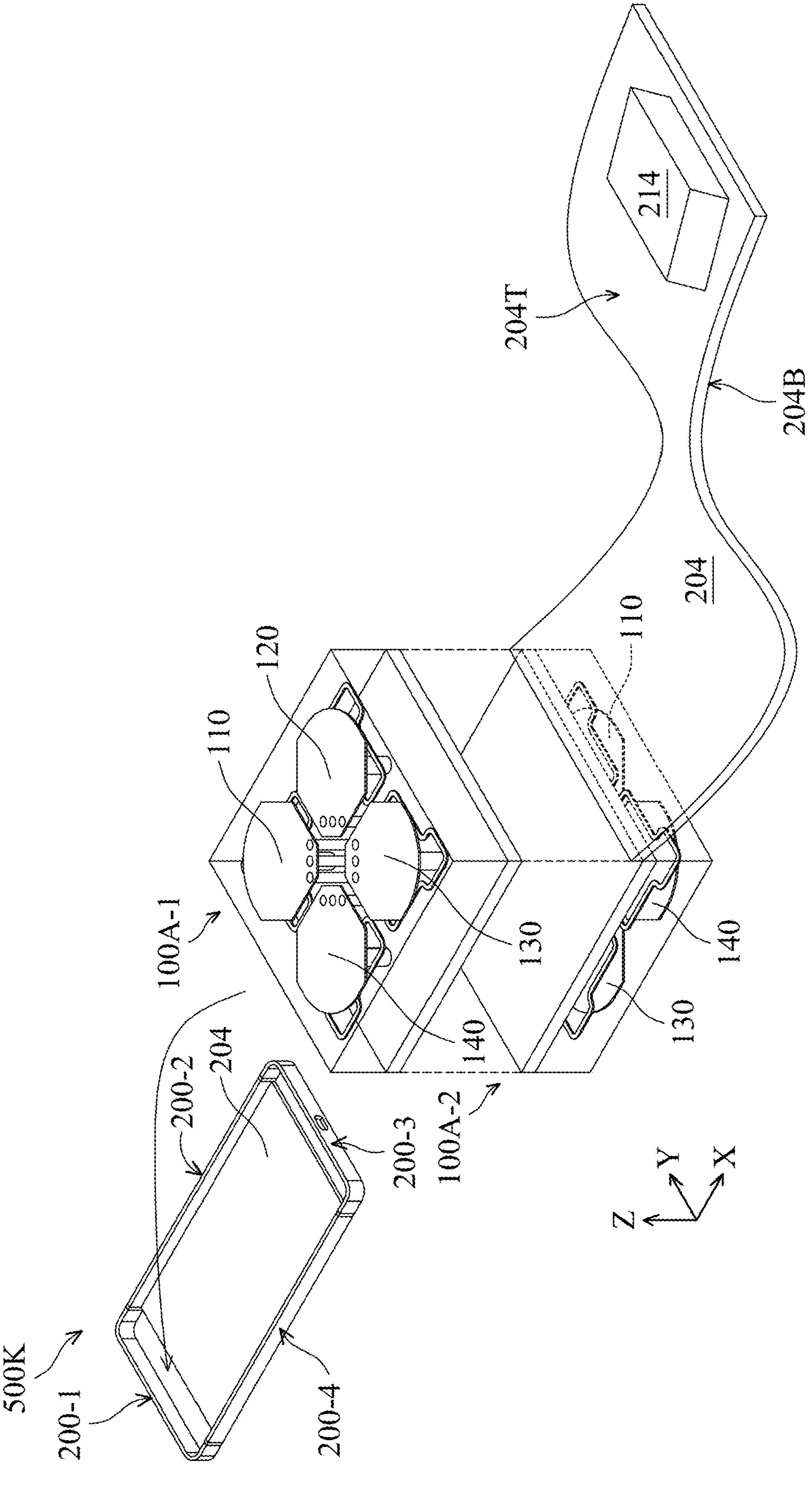
FIG. 11 is an exploded view of a MIMO antenna system including at least two MIMO antennas of FIG. 2 in accordance with some embodiments of the disclosure, showing the arrangements of the MIMO antennas.

FIG. 11 is an exploded view of a MIMO antenna system 500K including at least two MIMO antennas 100A-1, 100A-2 of FIG. 2 in accordance with some embodiments of the disclosure, showing the arrangements of the MIMO antennas 100A-1, 100A-2. Elements of the embodiments hereinafter, that are the same or similar as those previously described with reference to FIGS. 5, 6, 7A-7C and 8-10, are not repeated for brevity.

As shown in FIGS. 5 and 11, the difference between the MIMO antenna system 500A and the MIMO antenna system 500K at least includes that the MIMO antennas 100A-1, 100A-2 of the same MIMO antenna system may be mounted on opposite surfaces of the dielectric substrate 204, such as FPC, and stacked on top of each other. More specifically, the MIMO antenna 100A-1 is mounted on the first surface 204T of the dielectric substrate 204, the MIMO antenna 100A-2 is flipped upside down and mounted on a second surface 204B of the dielectric substrate 204 directly below the MIMO antenna 100A-1. The second surface 204B is opposite to the first surface 204T. The MIMO antenna 100A-1 is stacked on the MIMO antenna 100A-2. The stacked MIMO antennas 100A-1, 100A-2 may be disposed close to the side 200-1 of the metal frame 200.

As shown in FIG. 11, the radiators 110, 120, 130, and 140 of the MIMO antennas 100A-1, 100A-2 of the MIMO antenna system 500K extending parallel to XY-plane. In addition, the radiators 110, 120, 130, and 140 of the MIMO antennas 100A-1, 100A-2 in the same MIMO antenna system 500K may face opposite directions. For example, the M radiators (e.g., the radiators 110, 120, 130, and 140) of the MIMO antenna 100A-1 may be facing the positive Z-direction. The M radiators (e.g., the radiators 110, 120, 130, and 140) of the MIMO antenna 100A-2 may be in the negative Z-direction. Therefore, the angle between the facing direction (e.g., the positive Z-direction) of the MIMO antennas 100A-1 and the facing direction (e.g., the negative Z-direction) of the MIMO antenna 100A-2 is 180 degrees.

In this embodiment, the MIMO antenna system 500K may further include a connector 214 is disposed on the top surface 204T of the dielectric substrate 204. The connector 214 may be electrically connected to the MIMO antennas 100A-1, 100A-2. The MIMO antenna system 500K may be electrically coupled to other electronic components such as a printed circuit board (PCB) or any suitable component (not illustrated) through the connector 214.

In some embodiments, the MIMO antennas 100A-1, 100A-2 of the MIMO antenna system 500K may create uncorrelated signals mainly by pattern diversity.

In some embodiments, the radiators of the MIMO antennas of the same MIMO antenna system may be arranged linearly.

Figure 12:
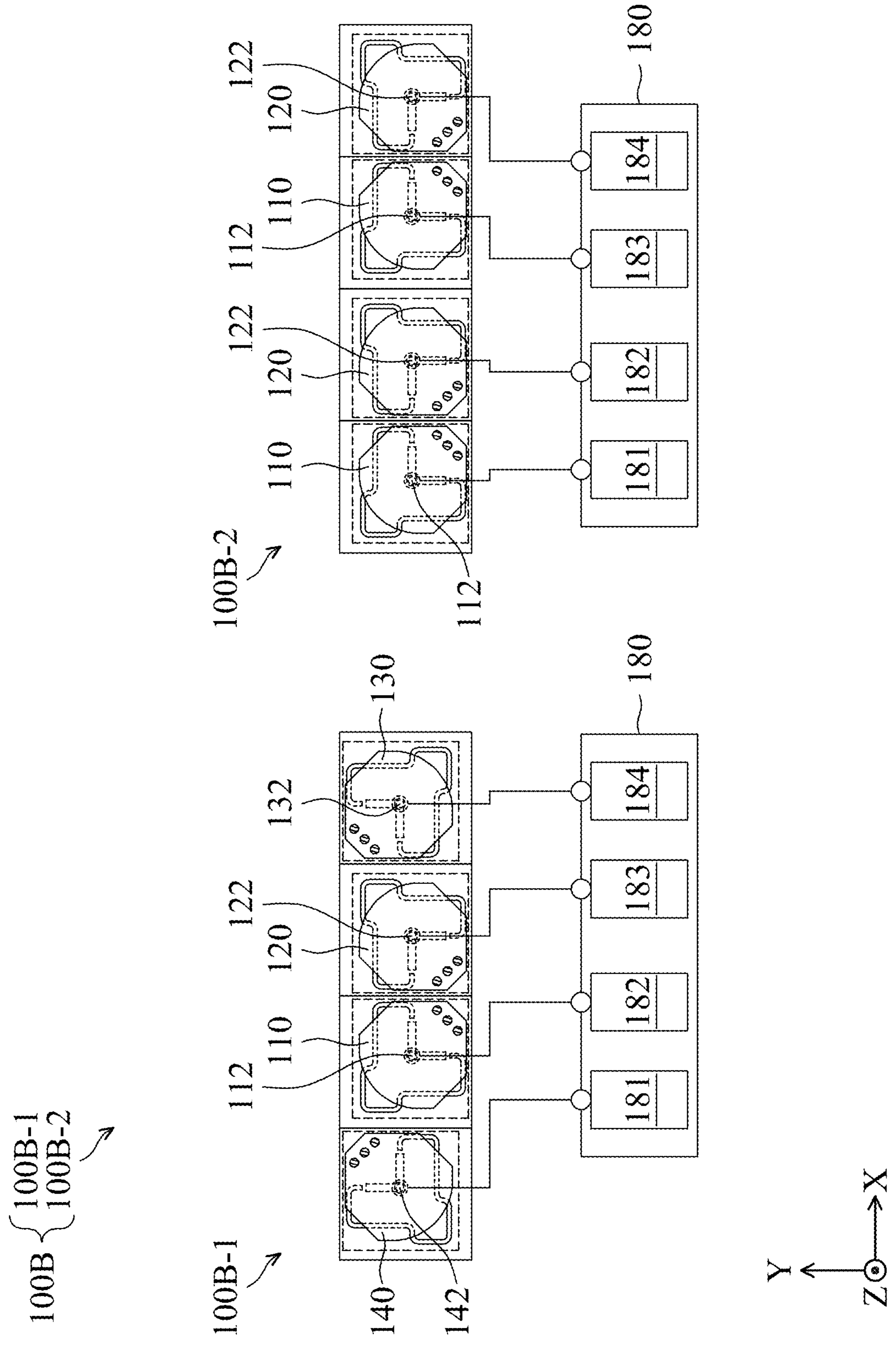
FIG. 12 is a top view of two MIMO antennas of a MIMO antenna system in accordance with some embodiments of the disclosure, showing the arrangements of the MIMO antennas.

FIG. 12 is a top view of two MIMO antennas 100B (including MIMO antennas 100B-1, 100B-2) of the MIMO antenna system 500 of FIG. 1 in accordance with some embodiments of the disclosure, showing the arrangements of the MIMO antennas. Elements of the embodiments hereinafter, that are the same or similar as those previously described with reference to FIGS. 5, 6, 7A-7C and 8-11, are not repeated for brevity.

As shown in FIGS. 4 and 12, the difference between the MIMO antenna 100A and the MIMO antennas 100B at least includes that the MIMO antennas 100B include M radiators (e.g., the radiators 110, 120, 130, and 140) arranged linearly. In addition, the feeding elements 112, 122, 132, 142 and the parasitic elements 113, 123, 133, 143 may be arranged linearly, corresponding to the radiators 110, 120, 130, and 140.

In this embodiment, the MIMO antennas 100B-1, 100B-2 are not identical. For example, the MIMO antennas 100B-1, 100B-2 both include M radiators (e.g., the radiators 110, 120, 130, and 140) arranged linearly in different sequence. For example, the radiators 140, 110, 120, and 130 of the MIMO antenna 100B-1 are sequentially (from left to right) arranged in a row. In the MIMO antenna 100B-1, the four transceivers 181, 182, 183 and 184 of the processing circuit 180 are electrically connected to the feeding elements 142, 112, 122, and 132 respectively. In this embodiment, the MIMO antennas 100B-1, 100B-2 are both used as 4×4 MIMO antennas. The MIMO antennas 100B-1, 100B-2 may form an 8×8 MIMO antenna system.

For example, the radiator 110, the radiator 120, another radiator 110, and another radiator 120 of the MIMO antenna 100B-2 are sequentially (from left to right) arranged in a row. In the MIMO antenna 100B-2, the four transceivers 181, 182, 183 and 184 of the processing circuit 180 are electrically connected to the feeding elements 112, 122, 132, and 142 respectively.

In some embodiments, the angle between the polarization directions of two adjacent radiators 110, 120, 130, and 140 of the MIMO antennas 100B-1, 100B-2 are equal to 90 degrees in order to mitigate interference between signals.

In some embodiments, the arrangements (including the placements, orientations, separation distance, facing directions, etc.) of the MIMO antennas 100B-1, 100B-2 in the same MIMO antenna system 500 are the same or similar as the MIMO antennas 100A-1, 100A-2 in the same MIMO antenna systems 500A, 500B, 500C, 500D, 500E, 500F, 500G, 500H, 500K previously described with reference to FIGS. 1-6, 7A-7C and 8-10, are not repeated for brevity. In some embodiments, the MIMO antennas 100B-1, 100B-2 of the MIMO antenna system 500 may create uncorrelated signals by spatial diversity, polarization diversity and/or pattern diversity.

In some embodiments, the MIMO antennas of the same MIMO antenna system may have the different number of radiators arranged linearly. For example, the MIMO antenna system 500 may include one M×M MIMO antenna having M radiators and M feeding elements and one N×N MIMO antenna having N radiators and N feeding elements to form a (M+N)×(M+N) MIMO antenna system, where each of M and N is a positive integer greater than (or equal to) 2, or any other suitable number. In some embodiments, N is not equal to M.

Figure 13:
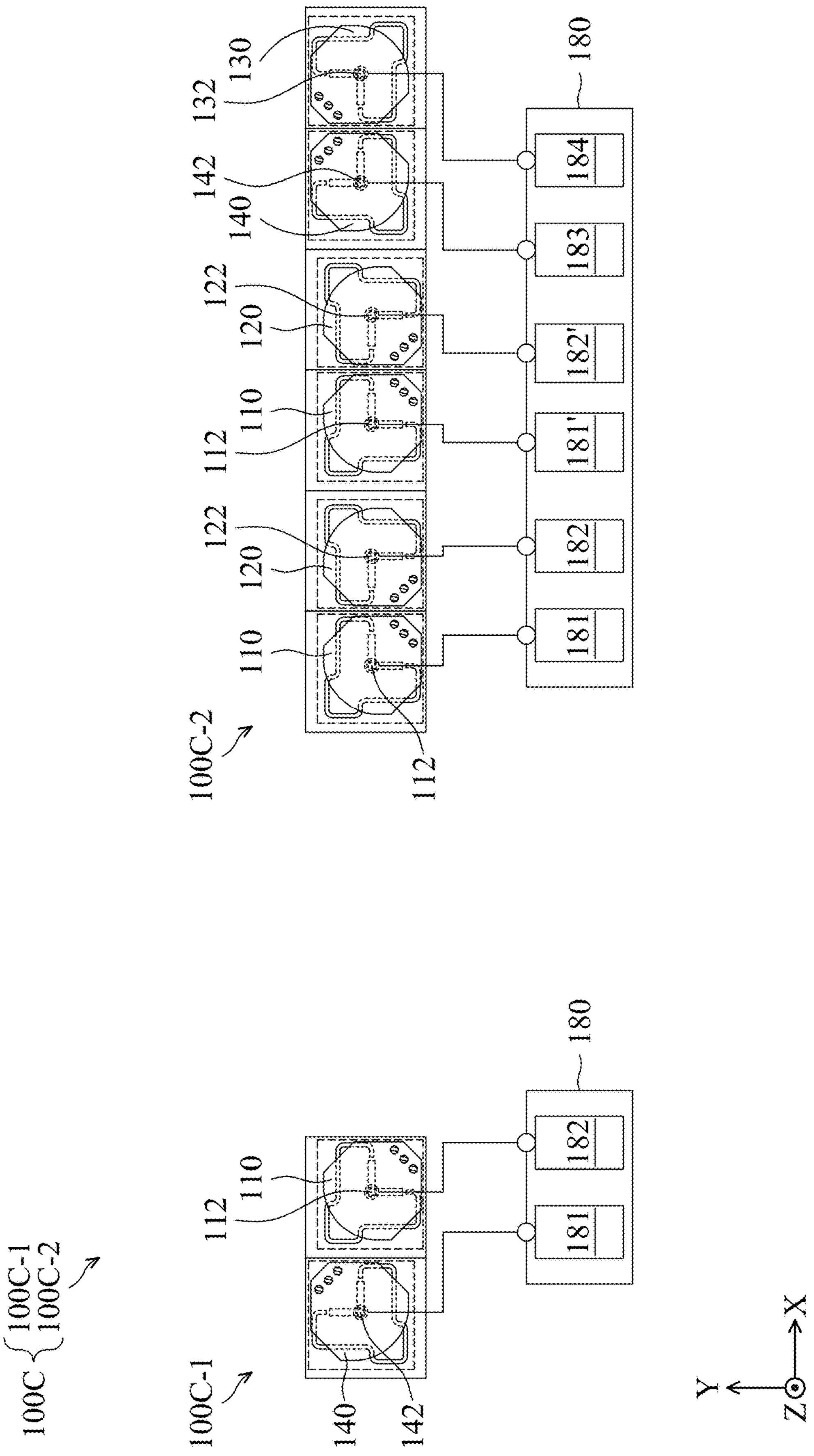
FIG. 13 is a top view of two MIMO antennas of a MIMO antenna system in accordance with some embodiments of the disclosure, showing the arrangements of the MIMO antennas.

FIG. 13 is a top view of two MIMO antennas 100C (including MIMO antennas 100C-1, 100C-2) of the MIMO antenna system 500 of FIG. 1 in accordance with some embodiments of the disclosure, showing the arrangements of the MIMO antennas. Elements of the embodiments hereinafter, that are the same or similar as those previously described with reference to FIGS. 5, 6, 7A-7C and 8-12, are not repeated for brevity.

As shown in FIGS. 12 and 13, the difference between the MIMO antennas 100B-1, 100B-2 and the MIMO antennas 100C-1, 100C-2 at least includes that the MIMO antennas 100C-1, 100C-2 are not identical. More specifically, the MIMO antennas 100C-1, 100C-2 have the different number of radiators and corresponding feeding elements. For example, the MIMO antenna 100C-1 includes 2 radiators (e.g., the radiators 140, 110) arranged linearly. The MIMO antenna 100C-2 includes 6 radiators (e.g., two radiators 110, two radiators 120, one radiator 130, and one radiator 140). In this embodiment, the MIMO antennas 100C-1 is used as a 2×2 MIMO antenna, the MIMO antenna 100C-2 is used as a 6×6 MIMO antenna. The MIMO antennas 100C-1, 100C-2 may form an 8×8 MIMO antenna system. It is noted that the number of the radiators of the MIMO antennas 100C-1, 100C-2 are not limited to the disclosed embodiments. For example, in the 8×8 MIMO antenna system 500, the MIMO antennas 100C-1 is a 3×3 MIMO antenna, the MIMO antenna 100C-2 is used as a 5×5 MIMO antenna.

For example, the radiators 140, 110 of the MIMO antenna 100C-1 are sequentially (from left to right) arranged in a row. In the MIMO antenna 100C-1, there are two transceivers 181 and 182 of the processing circuit 180 are electrically connected to the feeding elements 142 and 112 respectively.

For example, the radiators 110, 120, another radiator 110, another radiator 120, and the radiators 130, 140 of the MIMO antenna 100C-2 are sequentially (from left to right) arranged in a row.

In the MIMO antenna 100C-2, the radiators 130, 140 are both rotated 180 degrees in a clockwise direction. The two transceivers 181 and 182 of the processing circuit 180 are electrically connected to the feeding elements 112 and 122 corresponding to the radiators 110, 120 respectively. The other feeding elements 112 and 122 corresponding to the other radiators 110, 120 may be connected to the other transceiver 181' and 182' of the processing circuit 180. The feeding element 132 and the feeding element 142 corresponding to the radiator 130 and the radiator 140 may be connected to the transceiver 184 and 183 of the processing circuit 180 respectively.

In some embodiments, the angle between the polarization directions of two adjacent radiators 110, 120, 130, and 140 of the MIMO antennas 100C-1, 100C-2 are equal to 90 degrees in order to mitigate interference between signals.

In some embodiments, the arrangements (including the placements, orientations, separation distance, facing directions, etc.) of the MIMO antennas 100C-1, 100C-2 in the same MIMO antenna system 500 are the same or similar as the MIMO antennas 100A-1, 100A-2 in the same MIMO antenna systems 500A, 500B, 500C, 500D, 500E, 500F, 500G, 500H, 500K previously described with reference to FIGS. 1-6, 7A-7C and 8-10, are not repeated for brevity. In some embodiments, the MIMO antennas 100C-1, 100C-2 of the MIMO antenna system 500 may create uncorrelated signals by spatial diversity, polarization diversity and/or pattern diversity.

Embodiments provide a MIMO antenna system for multi-broadband and multi-polarization communication. The MIMO antenna system includes a dielectric substrate, a first MIMO antenna and a second MIMO antenna. The first MIMO antenna is mounted on the dielectric substrate. The second MIMO antenna is mounted on the dielectric substrate and beside the first MIMO antenna. The first MIMO antenna and the second MIMO antenna are configured to wirelessly access a set of first signals.

In some embodiments, the first MIMO antenna includes M radiators and M feeding elements. The M radiators are separated from each other. The M radiators are configured to wirelessly access the set of first signals. The M feeding elements are formed below the M radiators. The M feeding elements are connected to a first processing circuit. The M feeding elements are configured to access a set of second signals corresponding to the set of first signals between the M feeding elements and the first processing circuit, where M is a positive integer greater than (or equal to) 2. The second MIMO antenna includes N radiators and N feeding elements. The N radiators are separated from each other. The N radiators are configured to wirelessly access the set of first signals. The N feeding elements are formed below the N radiators. The N feeding elements are connected to a second processing circuit. The N feeding elements are configured to access the set of second signals corresponding to the set of first signals between the N feeding elements and the second processing circuit, where N is a positive integer greater than (or equal to) 2. In some embodiments, each of the M radiators in the first MIMO antenna may create uncorrelated signals by pattern diversity. Two adjacent M radiators in the first MIMO antenna may create uncorrelated signals by polarization diversity. In some embodiments, each of the N radiators in the second MIMO antenna may create uncorrelated signals by pattern diversity. Two adjacent N radiators in the second MIMO antenna may create uncorrelated signals by polarization diversity. In some embodiments, the MIMO antennas of the MIMO antenna system may create uncorrelated signals by spatial diversity, polarization diversity and/or pattern diversity.

In some embodiments, the M radiators of the first MIMO antenna are facing a first direction, and the N radiators of the second MIMO antenna are facing a second direction.

In some embodiments, the M radiators of the first MIMO antenna are planar conductors extending parallel to a first plane, and the N radiators of the second MIMO antenna are planar conductors extending parallel to a second plane parallel to the first plane.

In some embodiments, a first angle between the first direction and the second direction is 0 degrees.

In some embodiments, a first angle between the first direction and the second direction is 180 degrees.

In some embodiments, N is equal to M.

In some embodiments, the M radiators of each of the first MIMO antenna and the second MIMO antenna are arranged around a reference point.

In some embodiments, the M radiators of each of the first MIMO antenna and the second MIMO antenna have a first polarization direction to an $M^{th}$ polarization direction, wherein the first polarization direction of the M radiators of the first MIMO antenna are corresponding to the first polarization direction of the M radiators of the second MIMO antenna.

In some embodiments, the first polarization direction of the M radiators of the first MIMO antenna is parallel the first polarization direction of the M radiators of the second MIMO antenna.

In some embodiments, a second angle between the first polarization direction of the M radiators of the first MIMO antenna and the first polarization direction of the M radiators of the second MIMO antenna is A (360/M) degrees, wherein A is a positive integer from 1 to M.

In some embodiments, a second angle between the first polarization direction of the M radiators of the first MIMO antenna and the first polarization direction of the M radiators of the second MIMO antenna is less than 360/M degrees.

In some embodiments, the first MIMO antenna is stacked on the second MIMO antenna.

In some embodiments, the M radiators of the first MIMO antenna are planar conductors extending parallel to a first plane, and the N radiators of the second MIMO antenna are planar conductors extending parallel to a second plane perpendicular to the first plane.

In some embodiments, the M radiators of the first MIMO antenna are facing a first direction, and the N radiators of the second MIMO antenna are facing a second direction, wherein a first angle between the first direction and the second direction is 90 degrees.

In some embodiments, the M radiators of the first MIMO antenna and the N radiators of the second MIMO antenna are arranged linearly.

In some embodiments, a third angle between the polarization directions of two adjacent M radiators of the first MIMO antenna and a fourth angle between the polarization directions of two adjacent N radiators of the second MIMO antenna are equal to 90 degrees. In some embodiments, N is not equal to M.

In some embodiments, the set of first signals have a first wavelength. Two adjacent M radiators of each of the first MIMO antenna and the second MIMO antenna are separated from each other by a first distance that is equal to between 0.0015 times the first wavelength and 0.25 times the first wavelength.

In some embodiments, the set of first signals have a first wavelength. A first diameter of the first MIMO antenna and a second diameter of the second MIMO antenna are less than or equal to 0.5 times the first wavelength.

In some embodiments, the set of first signals have a first wavelength. A second distance between the first MIMO antenna and the second MIMO antenna is between 0.5 times the first wavelength and 8 times the first wavelength.

In some embodiments, the first MIMO antenna and the second MIMO antenna have small size (diameter) and place in different positions. When the MIMO antenna system is applicable to a mobile phone, the performance with hand blockage is improved.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A MIMO (multiple input and multiple output) antenna system, comprising:

a dielectric substrate;

a first MIMO antenna mounted on the dielectric substrate; and a second MIMO antenna mounted on the dielectric substrate and beside the first MIMO antenna, wherein the first MIMO antenna and the second MIMO antenna are configured to wirelessly access a set of first signals, wherein the first MIMO antenna comprises:

M radiators separated from each other, wherein the M radiators are configured to wirelessly access the set of first signals; and M feeding elements formed below the M radiators, connected to a first processing circuit, and configured to access a set of second signals corresponding to the set of first signals between the M feeding elements and the first processing circuit, wherein M is a positive integer greater than 2, and wherein the second MIMO antenna comprises:

N radiators separated from each other, wherein the N radiators are configured to wirelessly access the set of first signals; and N feeding elements formed below the N radiators, connected to a second processing circuit, and configured to access the set of second signals corresponding to the set of first signals between the N feeding elements and the second processing circuit, wherein N is a positive integer greater than 2, wherein N is equal to M, wherein the M radiators of the first MIMO antenna, and the N radiators of the second MIMO antenna, are arranged around a reference point, and wherein:

the first MIMO antenna further comprises M groups of conductive vias, each of the M groups of conductive vias connected to one of the M radiators respectively;

the second MIMO antenna further comprises N groups of conductive vias, each of the N groups of conductive vias connected to one of the N radiators respectively; and the M feeding elements of the first MIMO antenna, and the N feeding elements of the second MIMO antenna, are separated from the respective reference point by a first distance which is greater than a second distance that separates the M groups of conductive vias, and the N groups of conductive vias, from the respective reference point.

2. The MIMO antenna system as claimed in claim 1, wherein the M radiators of the first MIMO antenna are facing a first direction, and the N radiators of the second MIMO antenna are facing a second direction.

3. The MIMO antenna system as claimed in claim 2, wherein a first angle between the first direction and the second direction is 0 degrees.

4. The MIMO antenna system as claimed in claim 2, wherein a first angle between the first direction and the second direction is 180 degrees.

5. The MIMO antenna system as claimed in claim 4, wherein the first MIMO antenna is stacked on the second MIMO antenna.

6. The MIMO antenna system as claimed in claim 2, wherein a first angle between the first direction and the second direction is 90 degrees.

7. The MIMO antenna system as claimed in claim 1, wherein the M radiators of the first MIMO antenna are planar conductors extending parallel to a first plane, and the N radiators of the second MIMO antenna are planar conductors extending parallel to a second plane parallel to the first plane.

8. The MIMO antenna system as claimed in claim 1, wherein the M radiators of the first MIMO antenna, and the N radiators of the second MIMO antenna, have a first polarization direction to an $M^{th}$ polarization direction, wherein the first polarization direction of the M radiators of the first MIMO antenna are corresponding to the first polarization direction of the N radiators of the second MIMO antenna.

9. The MIMO antenna system as claimed in claim 8, wherein the first polarization direction of the M radiators of the first MIMO antenna is parallel the first polarization direction of the N radiators of the second MIMO antenna.

10. The MIMO antenna system as claimed in claim 8, wherein a second angle between the first polarization direction of the M radiators of the first MIMO antenna and the first polarization direction of the N radiators of the second MIMO antenna is A(360/M) degrees, wherein A is a positive integer from 1 to M.

11. The MIMO antenna system as claimed in claim 8, wherein a second angle between the first polarization direction of the M radiators of the first MIMO antenna and the first polarization direction of the N radiators of the second MIMO antenna is less than 360/M degrees.

12. The MIMO antenna system as claimed in claim 1, wherein the M radiators of the first MIMO antenna are planar conductors extending parallel to a first plane, and the N radiators of the second MIMO antenna are planar conductors extending parallel to a second plane perpendicular to the first plane.

13. The MIMO antenna system as claimed in claim 1, wherein:

the set of first signals have a first wavelength, and two adjacent radiators of each of the first MIMO antenna and the second MIMO antenna are separated from each other by a first distance that is equal to between 0.0015 times the first wavelength and 0.25 times the first wavelength.

14. The MIMO antenna system as claimed in claim 1, wherein:

the set of first signals have a first wavelength, and a first diameter of the first MIMO antenna and a second diameter of the second MIMO antenna are less than or equal to 0.5 times the first wavelength.

15. The MIMO antenna system as claimed in claim 1, wherein:

the set of first signals have a first wavelength, and a second distance between the first MIMO antenna and the second MIMO antenna is between 0.5 times the first wavelength and 8 times the first wavelength.

* * * * *